(12) United States Patent
Tupper

(10) Patent No.: US 6,820,649 B1
(45) Date of Patent: Nov. 23, 2004

(54) BALL FUEL VALVE WITH CONCENTRICALLY ORIENTED FEED POINTS

(76) Inventor: Willis E. Tupper, 11865 Durston, Pinckney, MI (US) 48169

( * ) Notice: Subject to any disclaimer, the term of this patent is extended or adjusted under 35 U.S.C. 154(b) by 158 days.

(21) Appl. No.: 10/353,399

(22) Filed: Jan. 29, 2003

(51) Int. Cl.[7] .............................................. F16K 11/087
(52) U.S. Cl. ................................. 137/625.41; 137/590
(58) Field of Search ...................... 137/625.41, 625.47, 137/590

(56) References Cited

U.S. PATENT DOCUMENTS

| | | | |
|---|---|---|---|
| 1,050,181 A | * | 1/1913 | Turner ......................... 137/590 |
| 1,132,833 A | | 3/1915 | Coseo |
| 1,461,805 A | * | 7/1923 | Parsons ....................... 137/590 |
| 1,462,217 A | | 7/1923 | Stalder et al. |
| 3,907,688 A | * | 9/1975 | Close .......................... 210/424 |
| 4,250,921 A | | 2/1981 | Pingel et al. |
| 4,328,833 A | * | 5/1982 | Auther ................... 137/625.47 |
| 4,890,644 A | | 1/1990 | Hoeptner, III et al. |
| 5,115,837 A | | 5/1992 | Tupper |
| 5,507,314 A | | 4/1996 | Knapp |

* cited by examiner

Primary Examiner—John Fox
(74) Attorney, Agent, or Firm—Young & Basile, P.C.

(57) ABSTRACT

The invention is a ball valve for controlling the flow of fluids between one of two inlets and an outlet. The two inlets are substantially coaxially located, permitting a single inlet point in a fuel supply vessel, yet still allowing two pickup points from within the vessel, such as for a "main" and a "reserve" source. The invention has a particular utility in fuel tanks for providing both a "main" and a "reserve" fuel source, such as for internal combustion engines.

4 Claims, 4 Drawing Sheets

BALL FUEL VALVE WITH CONCENTRICALLY ORIENTED FEED POINTS

RELATED APPLICATIONS

This application is related to, and claims the benefit of priority from, U.S. Provisional Patent Application Ser. No. 60/297,700, filed Jun. 12, 2001.

FIELD OF THE INVENTION

The present invention relates to fuel selector valves for fuel storage tanks, and more particularly to fuel selector valves having a main and reserve position.

BACKGROUND OF THE INVENTION

Operators of motorcycles, snowmobiles, other motorized equipment and vehicles having the need for flexibility in the operation of the fuel delivery system installed in those vehicles. One important such need is to provide the means for maintaining a reserve supply of fuel. The use of separate primary and reserve fuel reservoirs for motor vehicles has long been abandoned in favor of the selective placement of main and reserve fuel pickup points in the same tank. It has long been known to incorporate selectable reserve valves in a fuel storage tanks to provide access to a reserve supply of fuel. Utilizing this technique, a single fuel tank provides both main and reserve supplies of fuel for the motor, simply by virtue of the placement of multiple fuel feed points at different fuel level locations in that tank.

Typical of such fuel valves is my ball fuel valve with reserve position shown in U.S. Pat. No. 5,115,837, entitled "Ball Fuel Valve With Reserve Position." A rotatable ball-type valve is retained within a valve body. By positioning the ball within the valve body, fuel may be drawn from one of two locations in the same tank by selecting between one of two feed points in the ball valve housing.

While this device has proven acceptable, there are numerous problems associated with it and with other similar valves. In particular, the casting and machining of the dual feed point valve body elements is expensive, and the utilization of two separate pickup points necessitates the use of separate filtering elements. Also, the passageways within said valves can be unduly complex, and accordingly expensive to manufacture.

It is preferable to locate the pickup points in such valves coaxially, as taught by Pingel in U.S. Pat. No. 4,250,921 and Hoeptner, U.S. Pat. No. 4,890,644. The foregoing valves, however, are restricted in the amount of fuel which can be passed through the reserve inlet, and because they are not ball valves, are prone to poor sealing, allowing both fuel and air to bypass the desired fuel pathways.

The present invention overcomes the problems associated with the prior art by providing an inexpensive, relatively maintenance-free ball valve which has the capability of providing a positive selection of main fuel flow, reserve fuel flow and flow shutoff positions.

SUMMARY OF THE INVENTION

The present invention provides an improved fuel valve adapted for use in the fuel system of a motorized device of the type utilizing liquid fuels. The improved fuel valve generally includes a valve body, main and reserve inlet passageways coaxially located and attached to the valve body, a ball valve assembly disposed within the valve body, and a plurality of o-lings to seal the ball valve assembly within the valve body.

The valve body defines an internal valve chamber and a threaded external element adapted to be inserted into a corresponding and mating threaded element on the fuel tank of a motor-powered device.

The valve further includes main and reserve inlets and an outlet, all adapted to communicate with the internal valve chamber. The main fuel inlet and the reserve fuel inlet both communicate with the internal valve chamber in a coaxial configuration. The fuel outlet communicates with the chamber and opens outwardly at a location apart from the fuel inlets. A ball valve assembly is disposed within the internal valve chamber, and is provided with an inlet and outlet which may be selectively positioned to communicate with the fuel tank and the fuel outlet to the motor.

DETAILED DESCRIPTION OF THE DRAWINGS

DETAILED DESCRIPTION OF THE INVENTION

Figure 1:
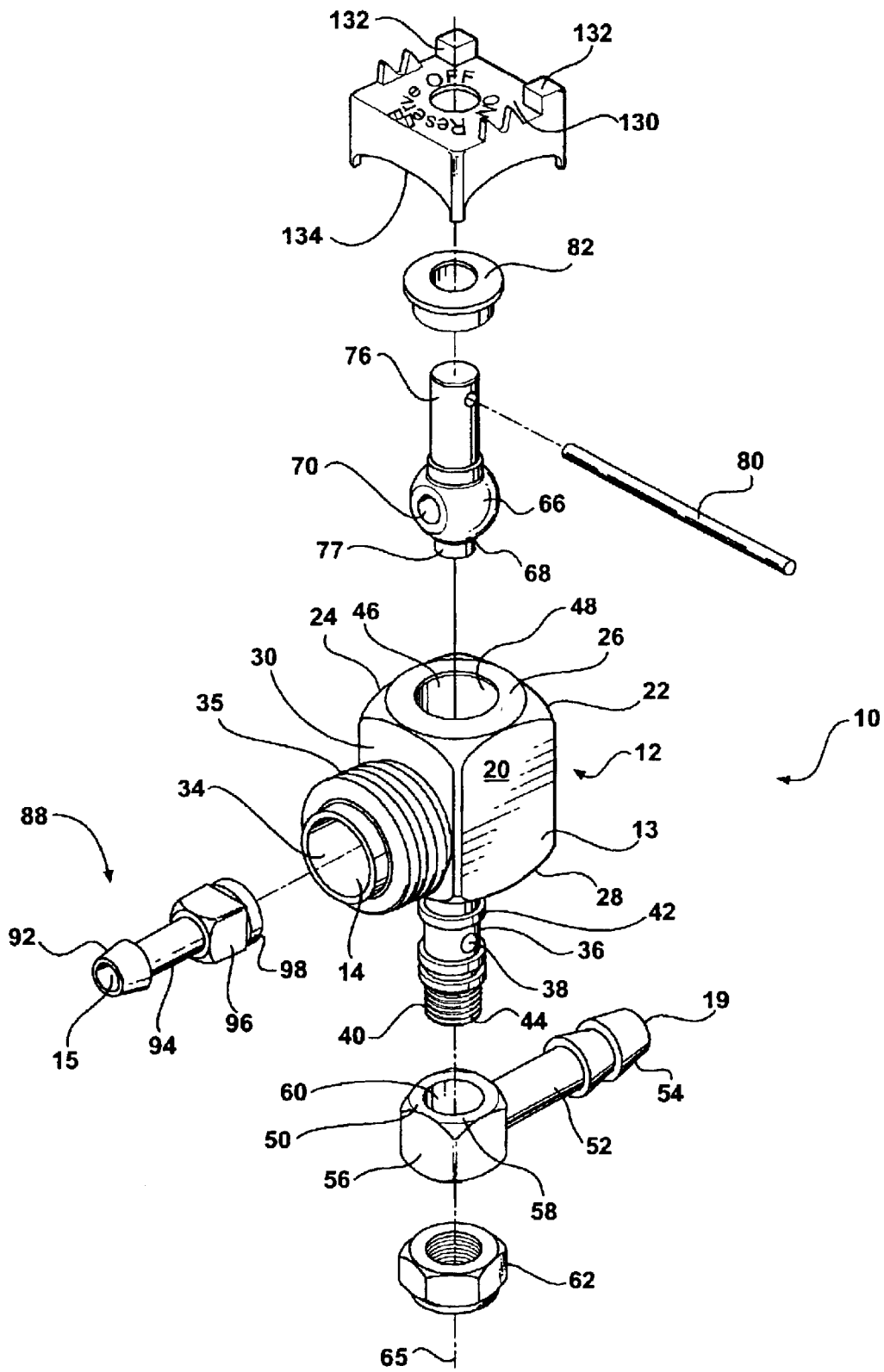
FIG. 1 is an exploded perspective view of the invention and its components.
Figure 3:
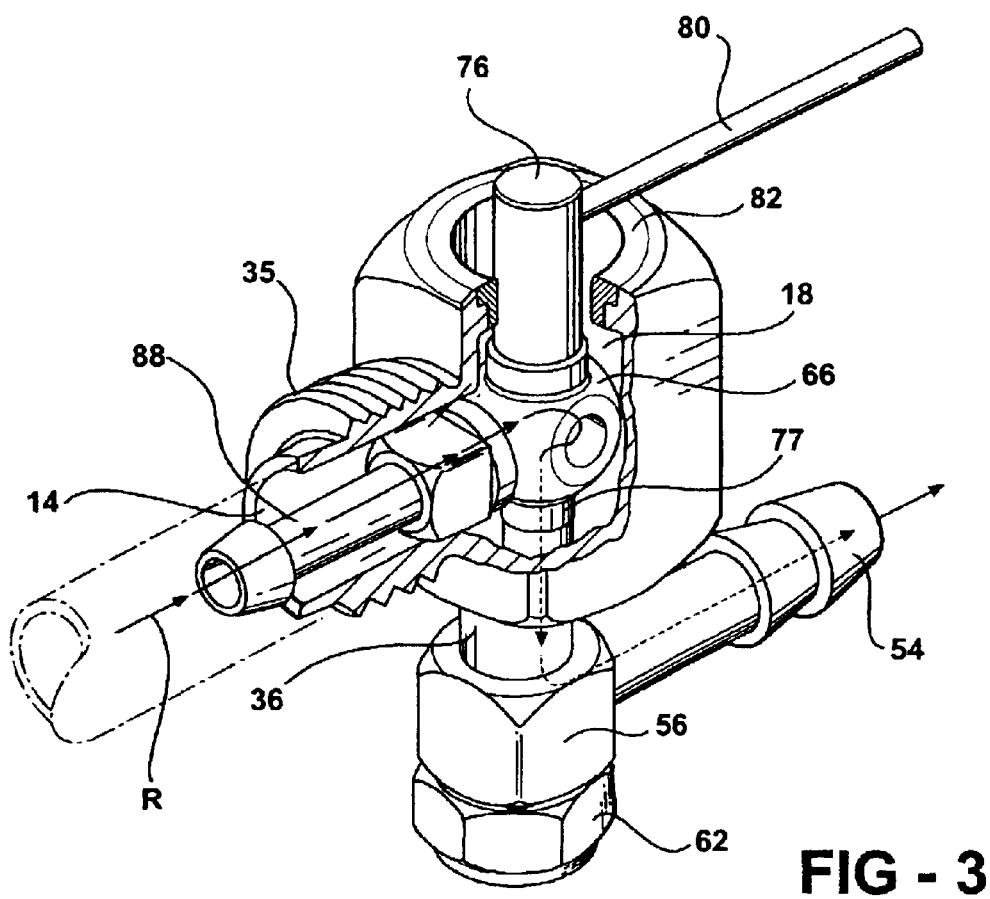
FIG. 3 is a cutaway perspective view of a ball valve according to the present invention showing the main components and one path for the flow of fuel.
Figure 5:
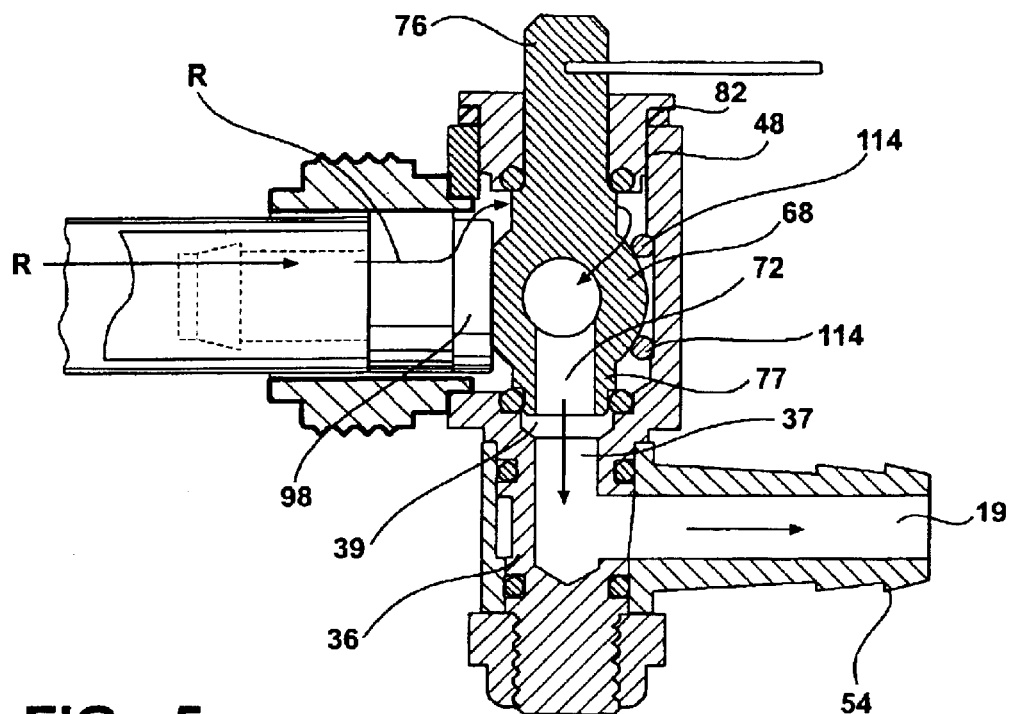
FIG. 5 is a cutaway view of a valve according to the present invention showing fuel flow through the reserve entry passageway.

The invention will best be understood by reference first to FIG. 1, FIG. 3 and FIG. 5.

The ball valve assembly 10 comprises a substantially monolithic valve body 12 provided with a dual inlet passageway 14, which communicates with a valve chamber 18 formed in the valve body 12 and an outlet passageway 37. The valve body 12, in one embodiment, has a main portion 13 of generally cubic configuration having a right facet 20, a rear facet 22, a left facet 24, a top 26, a bottom 28 and a front 30. Contiguous with front 30 is a threaded boss 32 comprising an inlet inner circumference 34 and threaded portion 35. The bottom 28 of main portion 13 has formed therein outlet passageway 37 to which communicates with outlet pipe 36. Preferably, threaded boss 32 and outlet pipe 36 are either machined as an integral element of valve body 12 or are attached thereto by pressure fits, brazing, welding or other techniques to insure a fluid-tight seal between threaded boss 32 and body main portion 13, as well as between outlet pipe 36 and body main portion 13. The dual inlet passage 14 communicates with valve chamber 18; likewise, outlet pipe 36 includes an outlet passageway 37 which communicates with valve chamber 18. The outlet passageway 37 of outlet pipe 36 likewise communicates with outlet 38 formed in the wall of outlet pipe 36, thereby permitting fluid within outlet passageway 37 to flow through outlet 38. The outlet element 56 comprises an outlet barrel 58, and an outlet nipple 52 provided with outlet barbs 54. The outlet barrel 58 has an inner circumference 60 which slides over and engages outlet pipe outer o-ring 40, outlet pipe inner o-ring 42 and threaded portion 44. The upper annular surface 50 of the outlet element 56 preferably contacts the bottom 28 of valve body main portion 13. The outlet barrel inner circumference 60 engages the outer circumference of outlet pipe o-rings 40 and 42, thereby creating a fluid-tight seal between the outlet barrel inner circumference 60 and the outer circumference of outlet pipe o-rings 40 and 42. O-rings 40 and 42 also create a fluid-tight seal between their inner circumference and the outer circumference of outlet pipe 36. The outlet element 56 further comprises an outlet passageway 19 which communicates with outlet passageway 37. When outlet element 56 is engaged with outlet pipe 36 as above-described, it is secured against the bottom 28 of main body portion 13 by lock nut 62 which engages outlet pipe threaded portion 44. In this embodiment, the outlet element 56 is free to rotate about the central axis 65 of outlet pipe 36, thereby permitting the outlet nipple 52 to be oriented at any angle in relation to the axis 65 of main body portion 13.

Figure 2:
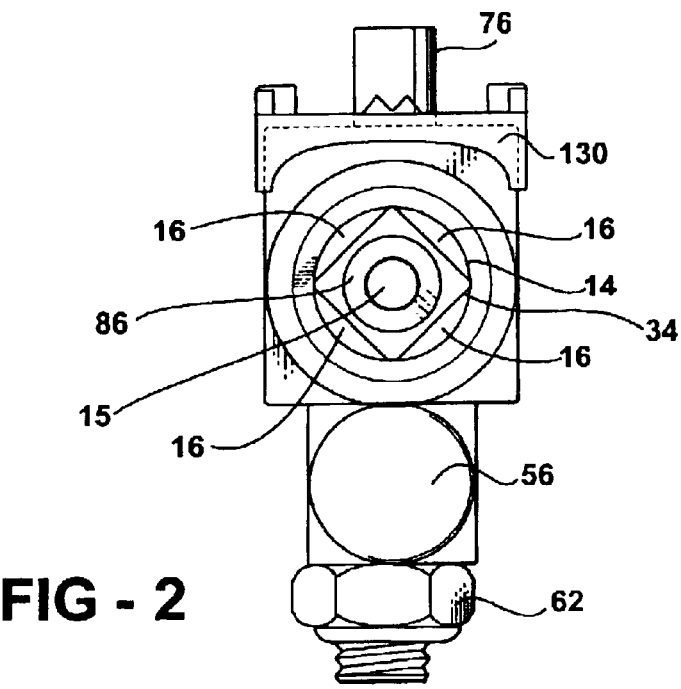
FIG. 2 is a view of a ball valve according to the present invention viewed from the inlet side.

With reference now to FIG. 1 and FIG. 2, the dual inlet passageway 14 has an inlet inner circumference 34 selected to accommodate a main inlet insert 88. Inlet insert 88 comprises a barb 92, block portion 96, bearing portion 98 and pipe 94 having main inlet 15. The block portion 96 is essentially square in cross-section, and the diagonal dimension of said cross-section corresponds to the inner diameter dimension of main inlet passageway 14, which is essentially circular in cross-section. Coaxial placement of the main inlet insert 88 within the inlet inner circumference 34 creates reserve passageways 16 for fuel flow which will be described herein in further detail. The main inlet insert 88 is provided with main inlet 15 which will communicate with valve chamber 18 in a manner which will be described Main inlet insert is a secure press fit into passageway 14, and is secure from movement once assembled into passageway 14.

Figure 6:
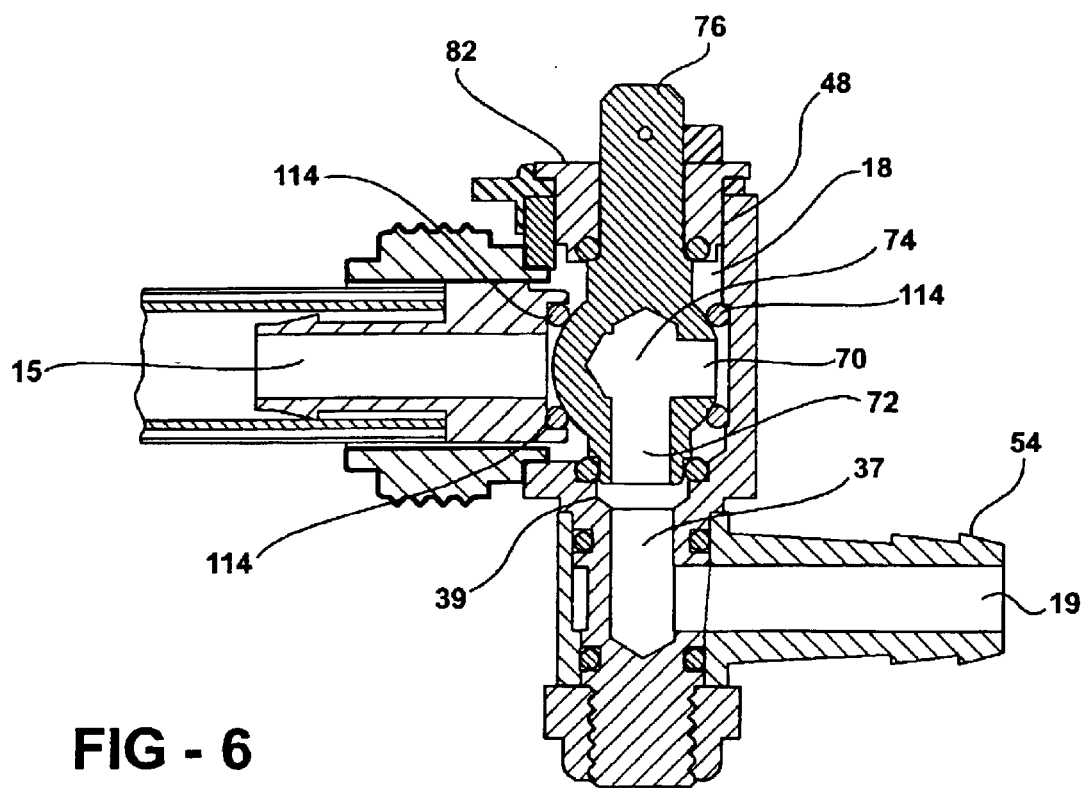
FIG. 6 is a cutaway view of a valve according to the present invention showing the valve in the shut-off position.

Referring now to FIG. 1, FIG. 3 and FIG. 6, it will be seen that a principal operative element of the invention is ball valve element 66, which is positioned within valve chamber 18 via ball valve entry 46. As can be appreciated from reference to both FIG. 1 and FIG. 6, the valve chamber 18 is substantially cylindrical, having an inner diameter which corresponds to the outer diameter of the ball portion 68 of ball valve element 66. Ball valve element 66 is provided with a ball valve inlet 70 and outlet 72, interconnected by passageway 74. Preferably, ball valve element 66 is monolithic, and includes a stem 76 located at one portion of the circumference of the ball portion, and a plug 77 located at a diametrically opposite portion of the ball portion 68. In this fashion, ball valve outlet 72 is formed within plug 77 and communicates with passageway 74 of ball portion 68, which in turn, communicates with ball valve inlet 70, thereby creating a flow path for fluid from the ball valve inlet 70 through the ball valve passageway 74 formed inside a ball portion 68, which further communicates with outlet 72. Ball valve element 66 is captured within the valve body 12. Plug 77 engages outlet 39 formed in the bottom 28 of valve body 13. Seal 82 surrounds the outer circumference of stem 76 and engages the valve entry inner circumference 48 as well as the top 26 of main valve portion 13. Preferably, the seal 82 is a press fit into the valve entry inner circumference 48 to create a fluid-tight seal with valve body 12.

The assembled orientation of the various components will be appreciated by reference to FIG. 2 and FIG. 3. When assembled, ball valve element 66 is pivotably disposed within valve chamber 18 by engagement of plug 77 with outlet 39 and the engagement of the outer circumference of stem 76 with the inner circumference of the opening in seal 82. This configuration permits ball valve element 66 to be rotated about an axis 65 which is perpendicular to the longitudinal axis of the main inlet insert 88 as positioned within the dual inlet passageway 14. Pivotal movement of ball valve element 66 serves to orient the ball valve inlet 70 in relation to the main inlet insert 88 as will be described in further detail herein. Rotation of the ball valve element 66 is facilitated by the inclusion of operating handle 80 affixed to stem 76.

The placement of main inlet insert 88 within main inlet passage 14 creates a plurality of reserve inlet passageways 16 positioned circumferentially around the central axis of the dual inlet passageway 14 as shown in FIG. 2. The square cross-section of the main inlet insert 88 juxtaposed with the circular cross-section of the dual inlet passageway 14 creates four reserve inlet passageways 16 having sufficient cross-section to permit necessary fuel flows as will be described.

Figure 4:
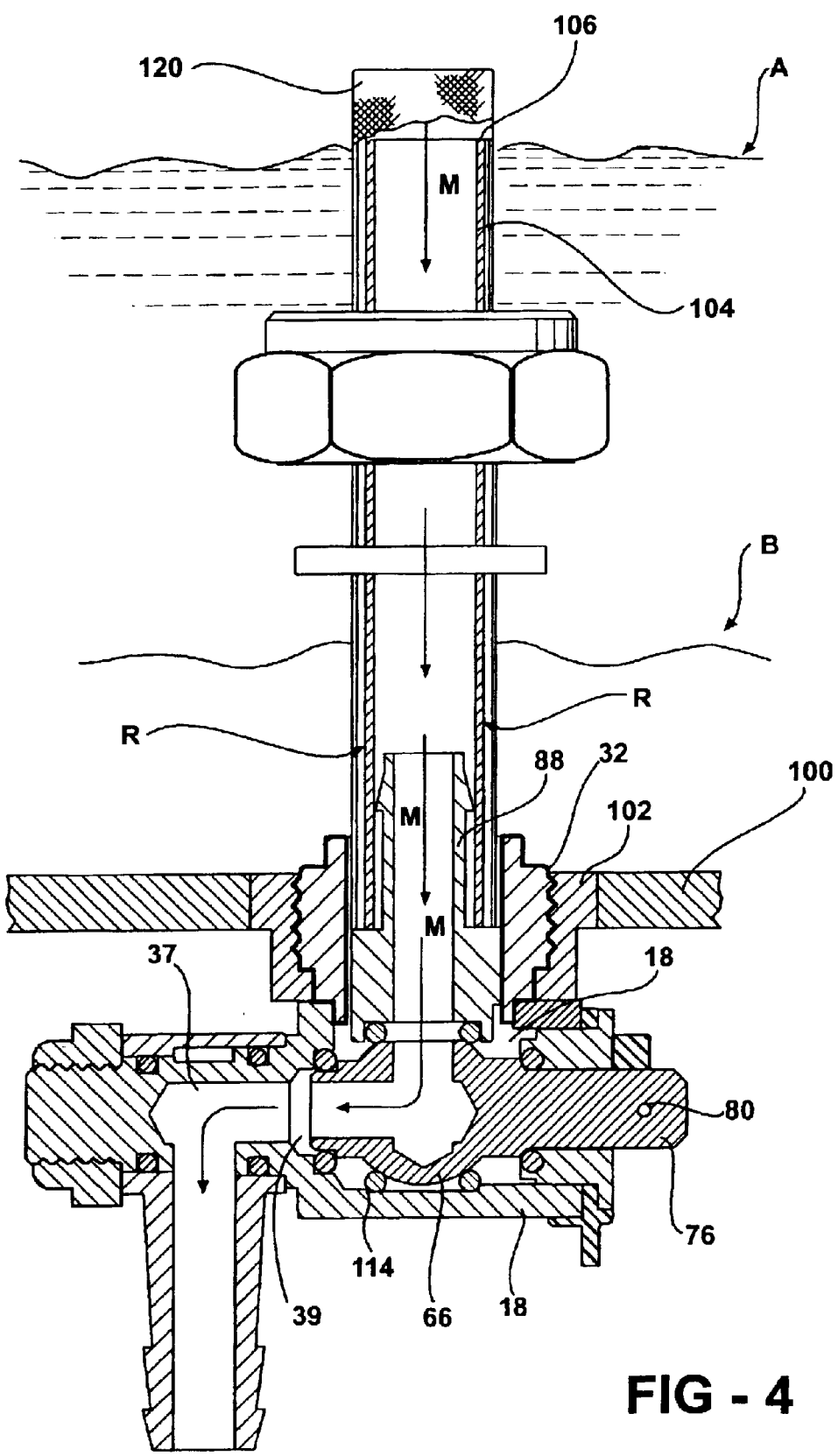
FIG. 4 is a cutaway view of a valve according to the present invention showing the position of the valve in relation to a typical fuel tank, and a second path for the flow of fuel.

An understanding of the function of the ball valve assembly 10 in relation to a typical fuel tank is depicted in FIG. 4. Preferably, the ball valve assembly 10 is threadably engaged to a threaded fitting 102 affixed to a fuel tank wall 100. In this embodiment, the valve body 12 is mounted utilizing the threaded boss 32 within a threaded fitting 102 on the bottom of a fuel tank. As can be readily perceived from the drawing, it is equally feasible to mount the ball valve assembly in the top of the tank, assuming that suitable adjustments are made in the overall length of the various inlet components herein described. Typically, a screen filter 120 is fitted to enclose the inlet elements of the assembly.

The ball valve assembly 10 may be likewise mounted to the tank utilizing a mounting nut and sealing washer to establish a fluid-tight seal between the valve body and the tank wall 100. When the level of fuel in the tank is at or above a reference level A, it can be seen that fuel can readily follow main flow path M within riser 104. At the same time, fuel is permitted to flow through reserve flow path R and through the reserve inlet passages 16. However, since the position of ball valve element 66 is such that ball valve inlet 70 is in axial alignment with dual inlet passageway 14, fuel flow through reserve inlet passages 16 enters valve chamber 18, but is prevented by the configuration of the ball portion 68 of ball valve element 66, together with its associated o-rings, from passage out of valve chamber 18, by virtue of the alignment of the valve inlet 70 with the axis of insert 88.

Once the level of fuel has dropped below reference line A, it will readily be seen that with the level of fuel below the lip 106 of riser 104, fuel can no longer follow main flow path M to enter main inlet passage 14, and the supply of fuel within the passageway will soon be exhausted. Such interruption in the supply of fuel may be anticipated by providing an appropriate gauge with a "empty" or "reserve" marking in association with the fuel tank levels, or may be annunciated by the stoppage of the engine being fed through the ball valve assembly 10. In any event, when it is desired to be able to utilize that portion of the fuel in the tank below reference line A, ball valve element 66 may be rotated 90o, thereby positioning the ball valve inlet 70 perpendicular to the flow path of fuel through the main inlet passage 14. Such position is indicated in FIG. 5. In this position, portions of the outer surface of ball portion 68 engage bearing portion 98 of insert 88, and sealing o-rings 114, thereby closing off further possible flows through the main flow path M. This sealing is desirable to prevent the introduction of air into the fuel flow path through the main fuel flow path M. Still, in this position, fuel entering the valve chamber 18 through the reserve inlet passages 16 is free to flow into ball valve inlet 70 through passageway 74 to outlet 72. In this fashion, a "reserve" level of fuel within the fuel tank may be selected to permit continued engine operation.

To interrupt all fuel flow through the valve assembly 10, ball valve element 66 is rotated an additional 90° to the position depicted in FIG. 6. In this orientation of ball valve element 66, it can be seen that the central axis of ball valve inlet 70 is oriented opposite to the central axis of main inlet 15, thereby sealing the circumference of ball valve inlet 70 from valve chamber 18. In this valve position, although fuel may enter the valve chamber 18 though reserve inlet passages 16, fuel is not permitted to pass to the ball valve inlet 70, as o-rings 114 seal the surface of ball portion 68 against the wall of valve chamber 18, thereby shutting off all fuel flow from both the main inlet 15 and the reserve inlet passages 16. In this fashion, fuel flow can be selectively stopped.

It is desirable in this embodiment of my invention to provide the ball valve assembly 10 with a combined indicator/stop plate 130 surrounding stem 76 and affixed to top 26 and seal 82. This plate 130 which is secured from rotational movement in relationship to stem 76, but located coaxially therewith, is provided with legends "on", "off", and "reserve". Further, such element may be provided with stops 132 which limit the travel of operating handle 80, and thereby limit the operating travel of ball valve element 66, through an arc of 180°. The legends on the plate 130 correspond with the positions of the operating handle 80, and, accordingly, the position of the ball valve inlet 70 in relation to the valve chamber 18, the reserve inlets 16 and main inlet 15. One or more detents 134 may be formed in the plate 130 to engage handle 80. Utilizing legends on this plate 130, the operator can correctly select the position of the ball valve element 66 to permit flow of fuel from either the main inlet passage 15 or the reserve inlet passages 16, or to shut off the flow of fuel altogether.

The threaded boss 32 and riser pipe 104, are preferably provided with filter 120 as shown in FIG. 4, to prevent contaminants within the fuel tank from passing to the motor. At the discharge or outlet side of the assembly the outlet nipple 52 is provided with barbs 54 designed to engage flexible hose (not shown) to further route the fuel flowing through the assembly to its desired destination.

By positioning the main and reserve inlet passages as above-described, it can be seen that the assembly may provide both main and reserve fuel flow passages within a single essentially cylindrical element which is relatively inexpensive to manufacture and simpler to install in fuel tanks than those valve assemblies currently known.

Having thus described my invention, numerous modifications will be apparent to those of ordinary skill in the art without departing from the invention herein described, which

I claim as follows:

1. A ball valve for selectively routing fluid from a fluid source to a fluid drain comprising:

a chamber;

a first inlet for routing fuel to said chamber, a first outlet for routing fuel from said chamber, a ball element rotatable within said chamber;

a second fuel inlet in said ball element;

a second fuel outlet in said ball element, a first passageway for introduction of fuel from said source to said chamber;

a second passageway for introduction of fuel from said source to said chamber;

said second passageway positioned at least partially within said first passageway.

2. The invention of claim 1, which further comprises means for selectively positioning said second fuel inlet in said ball element to communicate with said outlet and either of said first passageway or said second passageway.

3. The invention of claim 2, which further comprises means for selectively positioning said second fuel inlet in said ball element to communicate with neither of said second and said third passageway.

4. The invention of claim 1, wherein said second passageway is positioned coaxially within said first passageway.

* * * * *

UNITED STATES PATENT AND TRADEMARK OFFICE
CERTIFICATE OF CORRECTION

PATENT NO.   : 6,820,649 B1
DATED        : November 23, 2004
INVENTOR(S)  : Tupper It is certified that error appears in the above-identified patent and that said Letters Patent is hereby corrected as shown below:

Column 1,
Line 50, delete "arc" and insert -- are --;

Column 4,
Line 55, delete "900" and insert -- 90º --.

Signed and Sealed this

Fifteenth Day of February, 2005

JON W. DUDAS
*Director of the United States Patent and Trademark Office*